US006472652B2

(12) United States Patent
Miwa et al.

(10) Patent No.: US 6,472,652 B2
(45) Date of Patent: Oct. 29, 2002

(54) DISTANCE MEASURING APPARATUS (75) Inventors: Yasuhiro Miwa, Omiya (JP); Tatsuo Saito, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 153 days.

(21) Appl. No.: 09/725,677

(22) Filed: Nov. 30, 2000

(65) Prior Publication Data

US 2001/0002039 A1 May 31, 2001

(30) Foreign Application Priority Data

Nov. 30, 1999 (JP) .......................................... 11-340504

(51) Int. Cl.[7] .............................................. G01C 21/24
(52) U.S. Cl. .................................. 250/206.1; 250/201.6
(58) Field of Search ........................... 250/206.1, 201.6, 250/201.2, 559.39; 356/622, 624; 396/106, 98, 120

(56) References Cited

U.S. PATENT DOCUMENTS

| 5,148,011 A | * | 9/1992 | Taka ....................... 250/201.4 |
| 5,337,116 A | * | 8/1994 | Nonaka et al. .............. 354/403 |
| 5,659,387 A | * | 8/1997 | Yoshuda .................... 356/4.01 |
| 6,026,246 A | | 2/2000 | Yoshida et al. ............. 396/106 |

FOREIGN PATENT DOCUMENTS

JP          10-274524         10/1998

* cited by examiner

*Primary Examiner*—Robert H. Kim
*Assistant Examiner*—Irakli Kiknadze
(74) *Attorney, Agent, or Firm*—Leydig, Voit & Mayer, Ltd.

(57) ABSTRACT

Reflected light of each light beam projected toward an object at a distance to be measured is detected to provide a far signal and a near signal, and the far signal is compared with a preset clamp signal. The larger signal resulting from the comparison is outputted from a clamping circuit and a ratio of the output signal and the near signal is calculated to obtain an output ratio signal. Output ratio signals for light emissions from a light projecting unit are accumulated in an integration to produce an integral signal. The integral signal is transformed to a distance signal according to the distance by transformation equations selected based on whether the number of clamp signals outputted as output signals from the clamping circuit during the integration is larger than a set number. Ranging accuracy is improved by transforming the integral signal to the distance signal according to the distance by the transformation equations based on whether the number of clamp signals outputted as output signals from the clamping circuit during the integration of output ratio signals is larger than the set number.

3 Claims, 12 Drawing Sheets

DISTANCE MEASURING APPARATUS

BACKGROUND OF THE INVENTION

1. Field of the Invention

The present invention relates to a distance measuring apparatus for measuring the distance to an object and, more particularly, to a distance measuring apparatus of an active type used in cameras and the like.

2. Related Background Art

An example of the known distance measuring apparatus of the active type used in cameras and the like is a ranging device that has a light detecting unit for detecting light reflected from an object and outputting a near signal and a far signal according to the distance to the object and that is constructed to compare the far signal with a preset clamp signal, calculate an output ratio signal from a ratio of the larger signal resulting from the comparison, and the near signal, and transform the output ratio signal to a distance signal by either of different transformation equations, based on the value of the output ratio signal, as described in Japanese Patent Application Laid-Open No. H10-274524.

This distance measuring apparatus is a ranging device designed to gain a ranging result equivalent to that by the conventional photometry-ranging combination method, without and increase in circuit scale and within a short time and uniquely and stably determining the distance to the object even if it is large.

With this conventional ranging device, however, the ranging accuracy can be degraded if the output ratio signal is integrated multiple times to determine the distance to the object according to the integration result. For example, supposing the output ratio signal is repeatedly integrated multiple times and the far signal is approximately equal to the clamp signal, there will appear a variation in individual output ratio signals to be integrated. In this case, if the output ratio signal is transformed into the distance signal by a transformation equation based on a value of one output ratio signal, it will not be always possible to obtain the proper distance signal according to the distance to the object.

SUMMARY OF THE INVENTION

The present invention has been accomplished in order to solve the technical issue as described and an object of the invention is, therefore, to provide a distance measuring apparatus capable of improvement in the ranging accuracy.

In order to achieve the above object, a distance measuring apparatus according to the present invention is an apparatus comprising light projecting means for projecting a beam toward an object to be measured, multiple times; light receiving means for receiving reflected light of each beam projected to the object, at a reception position according to a distance to the object and outputting a far signal, which increases with increase in the distance, and a near signal, which increases with decrease in the distance; clamping means for comparing the far signal with a preset clamp signal, outputting the far signal itself when the far signal is not less than the clamp signal, and outputting the clamp signal when the far signal is smaller than the clamp signal; calculating means for calculating a ratio of the near signal and the output signal from the clamping means and outputting an output ratio signal; output signal detecting means for detecting whether the output signal from the clamping means is the far signal or the clamp signal; integrating means for accumulating the output ratio signal every projection of beam from the light projecting means to perform an integral operation and outputting an integral signal according to the result of the integral operation; and transforming means for transforming the integral signal to a distance signal according to the distance, in accordance with either of different transformation equations selected based on the result of detection of the output signal detecting means.

The distance measuring apparatus according to the present invention is also characterized in that the transforming means transforms the integral signal to the distance signal according to the distance by either of the different transformation equations, based on whether the number of output clamp signals from the clamping means during the integral operation of the integrating means is not less than a set number.

The distance measuring apparatus according to the present invention is also characterized in that the transforming means transforms the integral signal to the distance signal according to the distance by either of the different transformation equations, based on whether the number of output clamp signals from the clamping means during the integral operation of the integrating means is not less than a set number and whether the integral signal is not less than a set value.

According to the present invention, where the integral operation is carried out multiple times in a ranging routine, the integral signal is transformed to the distance signal by either of the different transformation equations, depending upon an output state of the clamp signal in every integral operation. It thus becomes feasible to transform the integral signal to the proper distance signal according to the distance to the object, thereby achieving the improvement in the ranging accuracy.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

A variety of embodiments according to the present invention will be described hereinafter based on the accompanying drawings. In the figures the same elements will be denoted by the same reference symbols and redundant description will be omitted. It is also noted here that dimensional ratios of the figures do not always agree with those in the description.

(First Embodiment)

Figure 1:
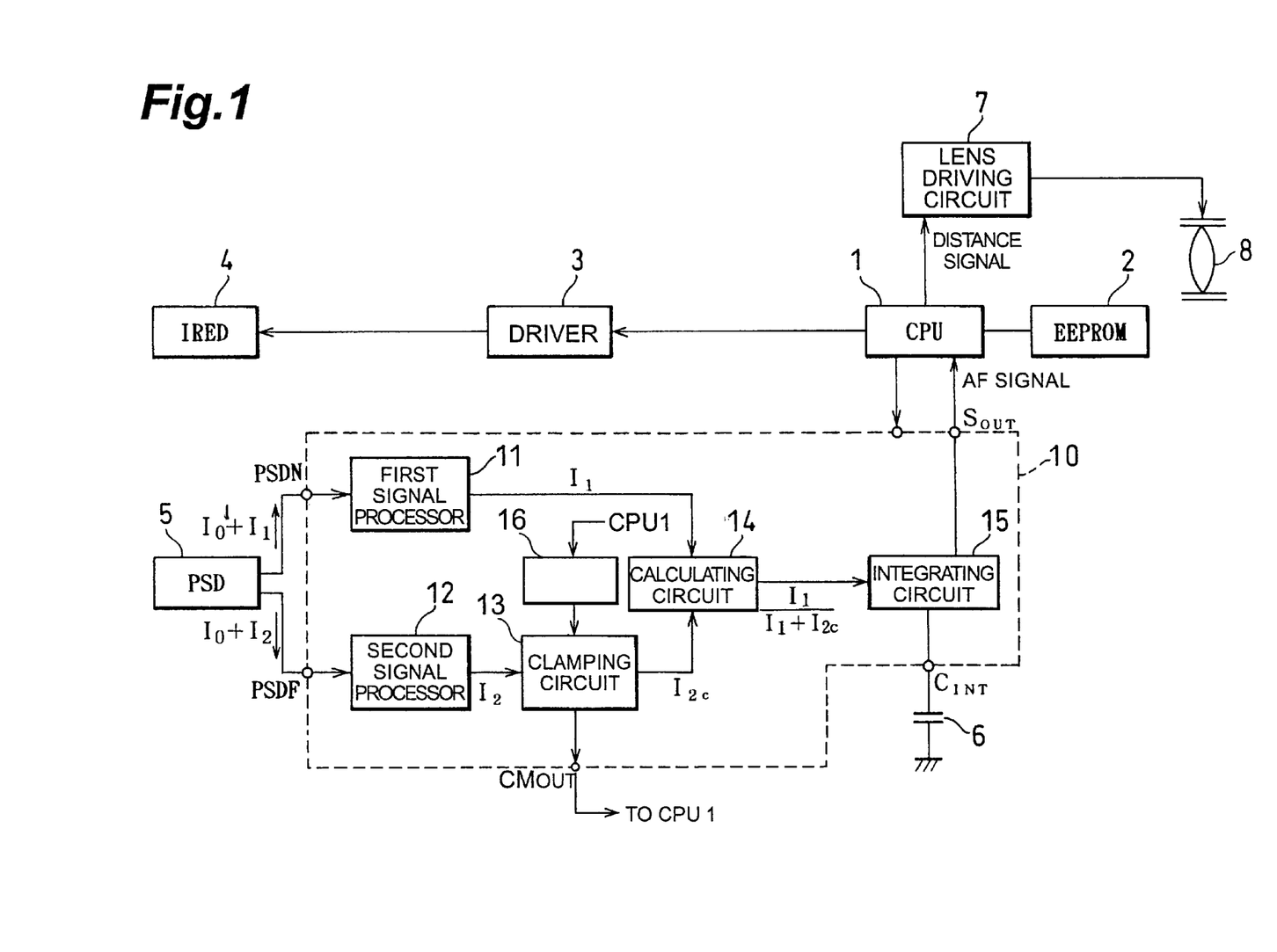
FIG. 1 is a block diagram of the distance measuring apparatus according to the first embodiment of the present invention.

FIG. 1 is a block diagram of the distance measuring apparatus according to the present embodiment.

As illustrated in FIG. 1, the distance measuring apparatus according to the present embodiment is provided with a CPU 1. The CPU 1 is a unit that carries out control of the entire camera equipped with the distance measuring apparatus and that performs the control of the entire camera including the distance measuring apparatus, based on programs and parameters preliminarily stored in EEPROM 2.

The distance measuring apparatus is equipped with an IRED (infrared emitting diode) 4. The IRED 4 serves as a light projecting means for projecting a light beam toward a ranging object in every emission of light. This IRED 4 is connected through a driver 3 to the CPU 1 and the light emission thereof is controlled by the CPU 1. The distance measuring apparatus is also provided with a PSD (position sensitive detector) 5. The PSD 5 functions as a light receiving means for receiving each reflected light of the light beam projected from the IRED 4 toward the object every emission. The distance measuring apparatus is further provided with an autofocusing IC (hereinafter referred to as "AFIC") 10 for processing output signals from the PSD 5. The operation of this AFIC 10 is controlled by the CPU 1 and an output AF signal (integral signal) from the AFIC 10 is entered into the CPU 1.

When a light beam of infrared light is emitted from the IRED 4, the beam is projected through a projection lens (not illustrated) placed in front of the IRED 4, onto the object. The light beam is reflected in part and the reflected light is received through a receiving lens (not illustrated) placed in front of the PSD 5, somewhere on a photoreceptive surface of the PSD 5. This reception position varies depending upon the distance to the object. Then the PSD 5 outputs two signals $I_1$ and $I_2$ according to the reception position.

The signal $I_1$ is a near signal which increases with decrease in the distance if the quantity of received light is constant. The signal $I_2$ is a far signal which increases with increase in the distance if the quantity of received light is constant. The sum of the signals $I_1$ and $I_2$ represents the quantity of reflected light received by the PSD 5. The near signal $I_1$ is supplied to a PSDN terminal of AFIC 10 and the far signal $I_2$ to a PSDF terminal of AFIC 10. Signals actually supplied to the AFIC 10, however, are signals resulting from addition of a stationary light component $I_0$ to the near signal $I_1$ and to the far signal $I_2$, depending upon the outside conditions.

The AFIC 10 is an integrated circuit (IC), which is composed of a first signal processing circuit 11, a second signal processing circuit 12, a clamping circuit 13, a calculating circuit 14, and an integrating circuit 15. The first signal processing circuit 11 accepts input of the signal $I_1+I_0$ from the PSD 5, eliminates the stationary light component $I_0$ from the signal, and outputs the near signal $I_1$. The second signal processing circuit 12 accepts input of the signal $I_2+I_0$ from the PSD 5, eliminates the stationary light component $I_0$ from the signal, and outputs the far signal $I_2$.

The clamping circuit 13 accepts input of the far signal $I_2$ from the second signal processing circuit 12, compares the far signal $I_2$ with a preset clamp signal $I_c$, outputs the far signal $I_2$ itself when the far signal $I_2$ is not less than the clamp signal $I_c$, and outputs the clamp signal $I_c$ when the far signal $I_2$ is smaller than the clamp signal $I_c$. The output signal from the clamping circuit 13 will be represented hereinafter by $I_{2c}$.

The clamping circuit 13 has the function of detecting whether the output signal $I_{2c}$ is the far signal $I_2$ or the clamp signal $I_c$. The details of the clamping circuit 13 will be described hereinafter.

The calculating circuit 14 accepts input of the near signal $I_1$ from the first signal processing circuit 11 and input of the output signal $I_{2c}$ from the clamping circuit 13, calculates an output ratio ($I_1/(I_1+I_{2c})$), and outputs an output ratio signal indicating the result thereof. This output ratio ($I_1/(I_1+I_{2c})$) represents the reception position on the photoreceptive surface of the PSD 5, i.e., the distance to the object.

The integrating circuit 15 accepts input of this output ratio signal and accumulates multiple output ratios in cooperation with an integrating capacitor 6 connected to a $C_{INT}$ terminal of the AFIC 10, thereby achieving improvement in S/N ratios. This accumulation of output ratios in the integrating capacitor 6 may be effected either in such a manner that the integrating capacitor 6 is preliminarily charged to a fixed voltage and then gradually discharged according to the output ratio signals or in such a manner that the integrating capacitor 6 in a discharged state is gradually charged according to the output ratio signals.

An output ratio resulting from the accumulation is outputted as an AF signal (integral signal) from an $S_{OUT}$ terminal of the AFIC 10. The CPU 1 accepts input of the AF signal from the AFIC 10, performs a predetermined operation to transform the AF signal to a distance signal, and outputs the distance signal to a lens driving circuit 7. The lens driving circuit 7 performs a focusing operation of a taking lens 8, based on the distance signal. The transformation operation from the AF signal to the distance signal in the CPU 1 will be described hereinafter.

Figure 2:
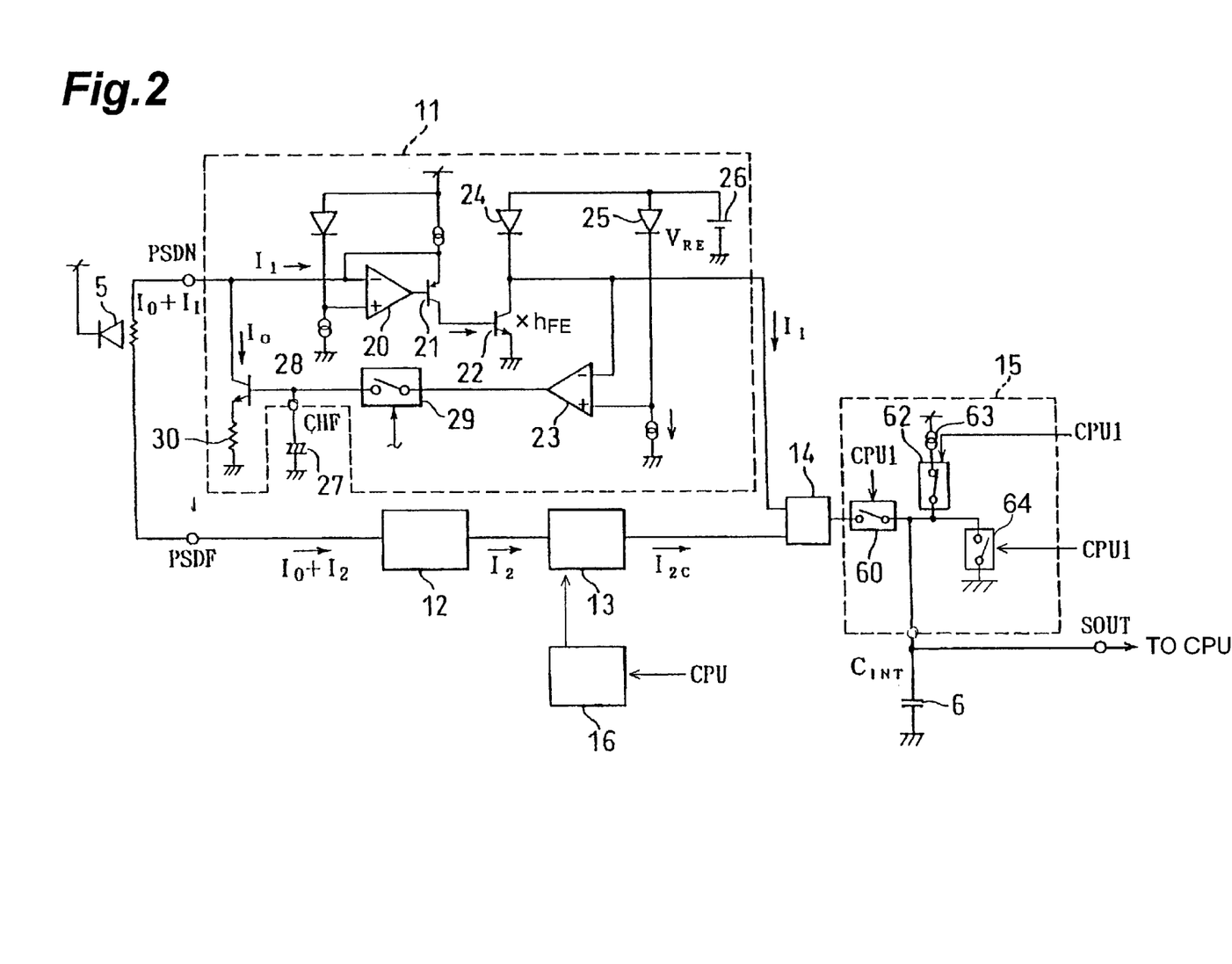
FIG. 2 is an explanatory diagram to illustrate a signal processing circuit etc. in the distance measuring apparatus of FIG. 1.

FIG. 2 is a specific structural diagram of the first signal processing circuit 11 and the integrating circuit 15 of the AFIC 10. The second signal processing circuit 12 also has a circuit configuration similar to that of the first signal processing circuit 11.

As illustrated in FIG. 2, the first signal processing circuit 11 is a circuit for receiving the near signal $I_1$ plus the stationary light component $I_0$ from the PSD 5, eliminating the stationary light component $I_0$, and outputting the near signal $I_1$. The current $(I_1+I_0)$ outputted from the near range terminal of the PSD 5 is supplied via the PSDN terminal of the AFIC 10 to the negative input terminal of operational amplifier 20 of the first signal processing circuit 11. The output terminal of the operational amplifier 20 is connected to the base terminal of transistor 21 and the collector terminal of the transistor 21 is connected to the base terminal of transistor 22. The negative input terminal of operational amplifier 23 is connected to the collector terminal of the transistor 22, and the cathode terminal of compressing diode 24 is connected to the collector terminal of the transistor 22. The cathode terminal of compressing diode 25 is connected to the positive input terminal of operational amplifier 23 and a first reference power supply 26 is connected to the anode terminals of the respective compressing diodes 24 and 25.

A stationary light eliminating capacitor 27 is externally connected to a CHF terminal of AFIC 10. This stationary light eliminating capacitor 27 is connected to the base terminal of stationary light eliminating transistor 28 in the first signal processing circuit 11. The stationary light eliminating capacitor 27 and operational amplifier 23 are connected through a switch 29 to each other and the CPU 1 controls on/off of this switch 29. The collector terminal of the stationary light eliminating transistor 28 is connected to the negative input terminal of the operational amplifier 20 and the emitter terminal of the transistor 28 is connected to a resistor 30 grounded at the other end.

On the other hand, in FIG. 2, the integrating circuit 15 is provided with the integrating capacitor 6 externally connected to the $C_{INT}$ terminal of the AFIC 10. The integrating capacitor 6 is connected through a switch 60 to the output terminal of the calculating circuit 14, connected through a switch 62 to a constant current source 63, and grounded through a switch 64. These switches 60, 62, and 64 are controlled by a control signal from the CPU 1.

Figure 3:
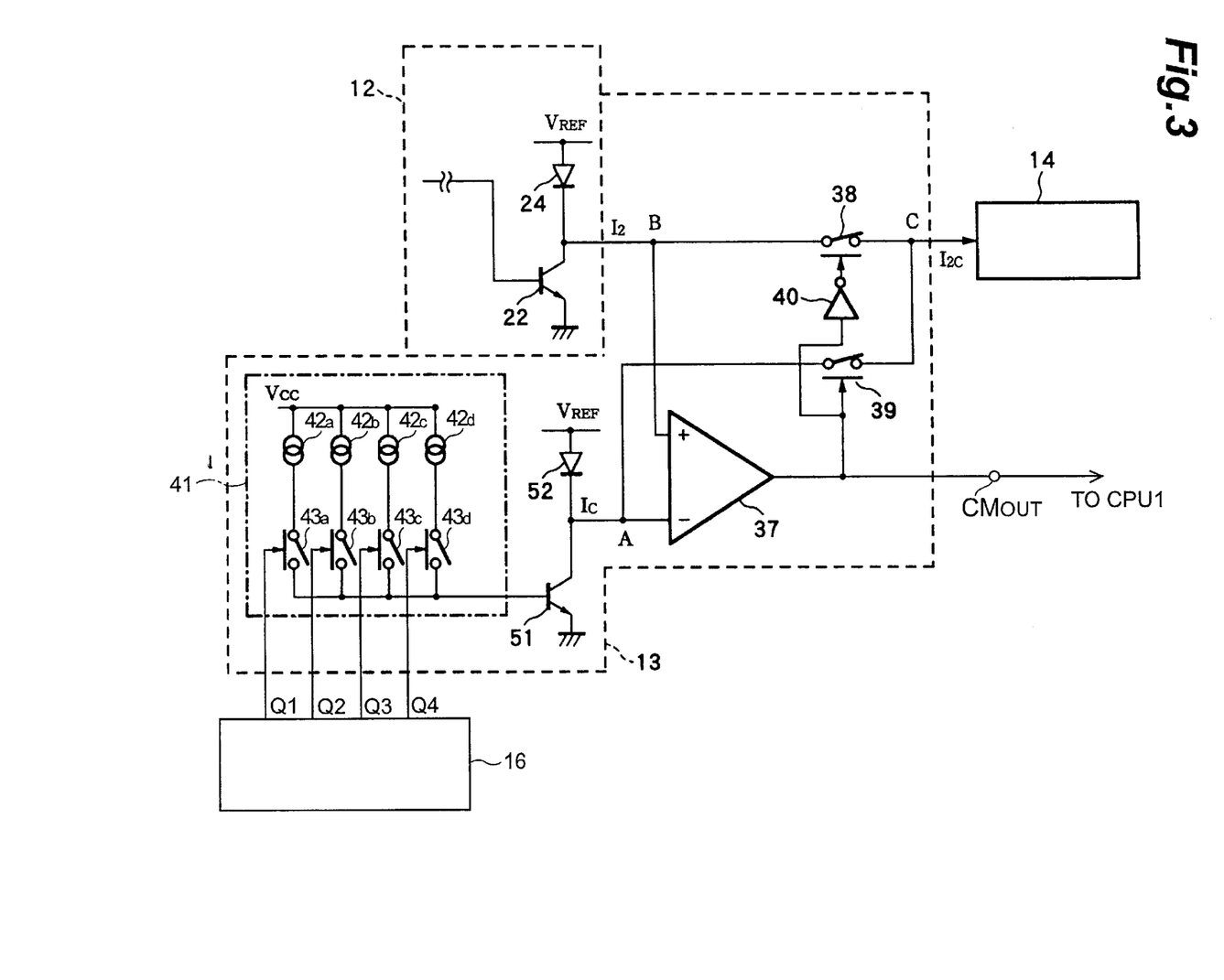
FIG. 3 is an explanatory diagram to illustrate a clamping circuit etc. in the distance measuring apparatus of FIG. 1.

FIG. 3 is a specific structural diagram of the clamping circuit 13 in the AFIC 10.

As illustrated in FIG. 3, the clamping circuit 13 has a comparator 37 for determining a level of the far signal $I_2$. The positive input terminal of the comparator 37 is connected to the collector terminal of the transistor 22 in the second signal processing circuit 12 and is also connected through a switch 38 to the input terminal of the calculating circuit 14. On the other hand, the negative input terminal of the comparator 37 is connected to the collector terminal of transistor 51 and to the cathode terminal of compressing diode 52 as the positive input terminal thereof is connected to the transistor 22 and to the compressing diode 24. The negative input terminal of the comparator 37 is also connected through a switch 39 to the input terminal of the calculating circuit 14.

A clamp current source 41 is connected to the base terminal of the transistor 51. In the clamp current source 41, a constant current source 42a and a switch 43a are connected in series, a constant current source 42b and a switch 43b are connected in series, a constant current source 42c and a switch 43c are connected in series, a constant current source 42d and a switch 43d are connected in series, and the other ends of these switches 43a to 43d are connected to the base terminal of the transistor 51.

For example, the constant current source 42a outputs a constant current of 0.125 nA, the constant current source 42b a constant current of 0.25 nA, the constant current source 42c a constant current of 0.5 nA, and the constant current source 42d a constant current of 1.0 nA.

The switches 43a to 43d become opened or closed under control by signals Q1 to Q4 from a clamp level switching circuit 16. Then the clamp current source 41 supplies a clamp current as the sum of currents from the constant current sources corresponding to closed switches, to the base terminal of the transistor 51. This clamp current becomes the base current of the transistor 51 and a collector potential according to the magnitude thereof is supplied to the negative input terminal of the comparator 37. The clamp current is properly set on the occasion of manufacturing of the distance measuring apparatus.

The output terminal of the comparator 37 is connected to the switch 39 and thus the output signal from the comparator 37 is supplied thereto. The output terminal of the comparator 37 is connected via an inverter 40 to the switch 38 and thus an inverted signal from the output signal of the comparator 37 is supplied to the switch 38. Therefore, the switches 38 and 39 are in such a relation that one becomes on while the other becomes off according to the output signal from the comparator 37.

The output signal from the comparator 37 is outputted through the $CM_{OUT}$ terminal from the AFIC 10 to the CPU 1. This output signal of the comparator 37 is a high potential signal when the far signal $I_2$ entered through the positive input terminal is greater than the clamp signal $I_c$ entered through the negative input terminal. The output signal of the comparator 37 is a low potential signal conversely when the far signal $I_2$ entered through the positive input terminal is smaller than the clamp signal $I_c$ entered through the negative input terminal.

For this reason, the comparator 37 functions as an output signal detecting means for detecting whether the output signal $I_{2c}$ from the clamping circuit 13 is the far signal $I_2$ or the clamp signal $I_c$.

In the next place, the operation of the distance measuring apparatus according to the present embodiment will be described.

In FIG. 1, the IRED 4 emits light in response to the control signal from the CPU 1 to project light beams through the projection lens (not illustrated) onto a subject being an object to be measured. On that occasion, the IRED 4 emits light plural times so as to blink under control of the CPU 1, thereby projecting the light beams.

In every beam projection from the IRED 4, reflected light from the subject illuminates the PSD 5 through the receiving lens (not illustrated). At this time, the reflected light impinges at the position according to the distance to the subject and the PSD 5 outputs the near signal $I_1$ and the far signal $I_2$ together with the stationary light component $I_0$ in correspondence to the impinging position.

The near signal $I_1$ with the stationary light component $I_0$ is entered to the PSDN terminal of the AFIC 10 and the far signal $I_2$ with the stationary light component $I_0$ to the PSDF terminal of the AFIC 10.

Figure 4:
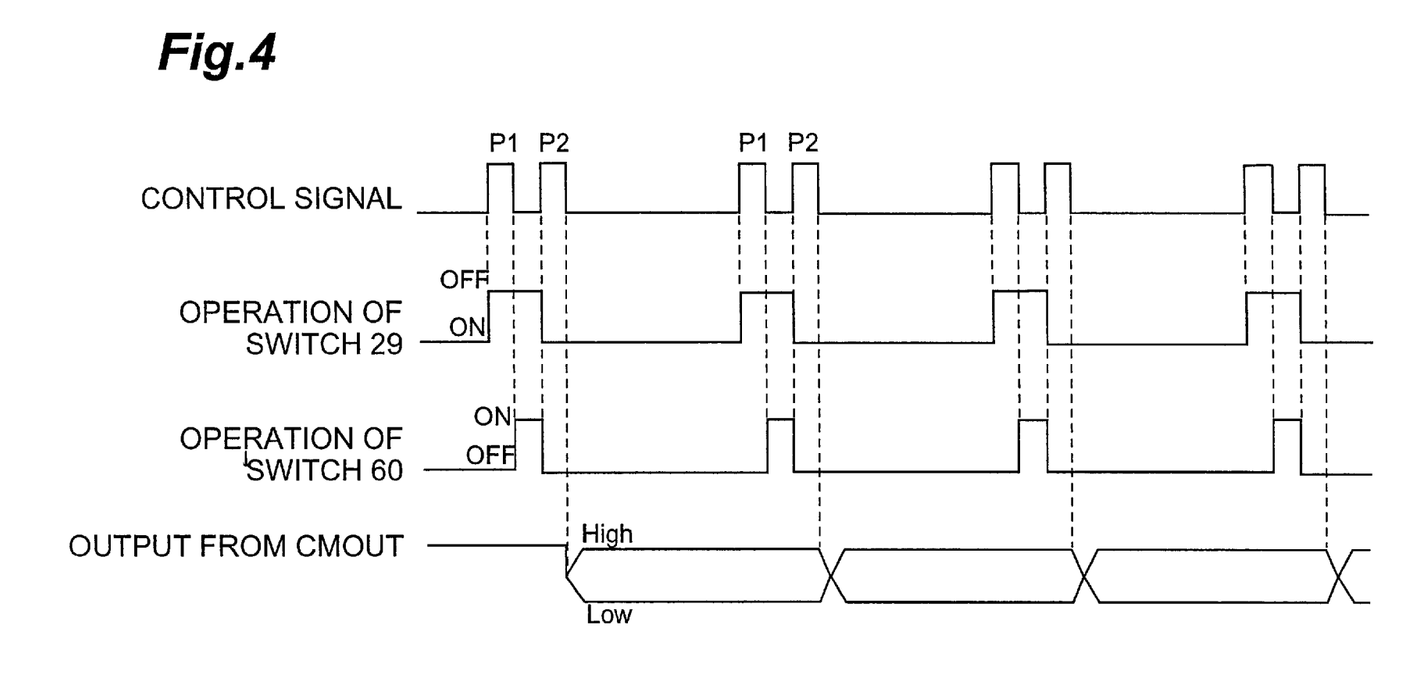
FIG. 4 is a timing chart in the operation of the distance measuring apparatus of FIG. 1.

On the other hand, as illustrated in FIG. 4, the control signal is supplied from the CPU 1 to the AFIC 10. The control signal is a signal including intermittent repetition of two pulses and the IRED 4 emits light in synchronism with the two pulses. The AFIC 10 holds the stationary light in accordance with this control signal. Specifically, as illustrated in FIG. 2, the switch 29 is switched off at the same time as the rise of the first pulse P1 of the control signal, to retain the charge of the stationary light eliminating capacitor 27 in the first signal processing circuit 11 and in the second signal processing circuit 12 of the AFIC 10.

This causes the stationary light component $I_0$ entered through the PSDN terminal into the first signal processing circuit 11 and the stationary light component $I_0$ entered through the PSDF terminal into the second signal processing circuit 12 each to flow through the transistor 28 to the earth, thereby separating the stationary light component $I_0$ from the near signal $I_1$ and from the far signal $I_2$. Then the first signal processing circuit 11 outputs the near signal $I_1$ to the calculating circuit 14. On the other hand, the second signal processing circuit 12 outputs the far signal $I_2$ to the clamping circuit 13.

In the clamping circuit 13, as illustrated in FIG. 3, the comparator 37 compares the far signal $I_2$ with the preset clamp signal $I_c$. When the far signal $I_2$ is greater than the clamp signal $I_c$ in the comparison, the output of the comparator 37 becomes high (high potential) to turn the switch 39 off and the switch 38 on, whereby the clamping circuit 13 outputs the far signal $I_2$ as the output signal $I_{2c}$. On the other hand, when the far signal $I_2$ is smaller than the clamp signal $I_c$, the output of the comparator 37 becomes low (low potential) to turn the switch 39 on and the switch 38 off, whereby the clamping circuit 13 outputs the clamp signal $I_c$ as the output signal $I_{2c}$.

At this time, the output signal of the comparator 37 is outputted as an output detection signal from the $CM_{OUT}$ terminal of the AFIC 10 to the CPU 1 every light emission of IRED 4 and integral operation, as illustrated in FIG. 4. The CPU 1 can detect whether the output signal $I_{2c}$ is either the far signal $I_2$ or the clamp signal $I_c$ in the integral operation per light emission, based on the output detection signal.

Then, as illustrated in FIG. 2, the near signal $I_1$ from the first signal processing circuit 11 and the output signal $I_{2c}$ from the clamping circuit 13 are supplied to the calculating circuit 14. The calculating circuit 14 calculates the output ratio signal based on the near signal $I_1$ and the output signal $I_{2c}$ and outputs the signal to the integrating circuit 15.

In the integrating circuit 15, as illustrated in FIG. 4, the switch 60 is turned on and off based on the control signal from the CPU 1 to perform the integral operation in the integrating capacitor 6. Namely, in FIG. 2, the integrating capacitor 6 is charged or discharged according to the output ratio signal from the calculating circuit 14 with on of the switch 60. Then output ratio signals are gradually accumulated in the integrating capacitor with repetition of on/off of the switch 60. The number of such integral operations is set in the EEPROM 2 and pulses of the control signal are entered according to the number of integral operations.

After completion of the set number of integral operations, a charge voltage or a discharge voltage of the integrating capacitor 6 is read as an AF signal into the CPU 1. The CPU 1 transforms the AF signal to a distance signal and outputs it to the lens driving circuit 7.

The transformation process from the AF signal to the distance signal will be described below in detail.

Figure 5:
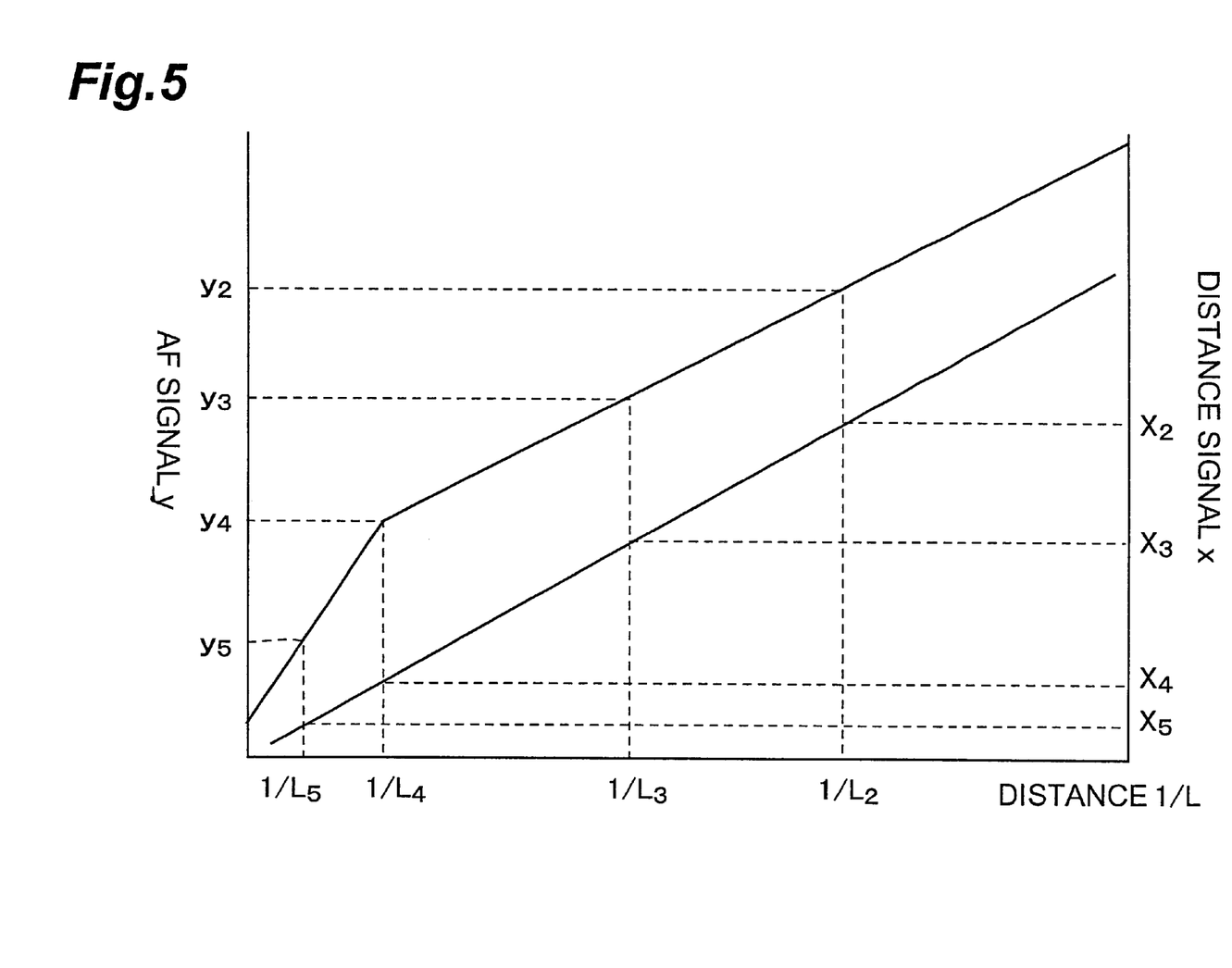
FIG. 5 is an explanatory diagram to illustrate signal transformation in the distance measuring apparatus of FIG. 1.

FIG. 5 is an explanatory diagram to illustrate the transformation from the AF signal to the distance signal. In the graph illustrated in this figure, the axis of abscissa indicates the inverse (1/L) of the distance L to the object, the left axis of ordinate the AF signal, and the right axis of ordinate the distance signal. This graph shows the relationship between the distance L and the AF signal and the relationship between the distance L and the distance signal. Particularly, the AF signal is y2 and the distance signal is x2 against the distance L2; the AF signal is y3 and the distance signal is x3 against the distance L3; the AF signal is y4 and the distance signal is x4 against the distance L4; the AF signal is y5 and the distance signal is x5 against the distance L5. It is noted that the magnitude relation is L2<L3<L4<L5.

Here the AF signal is in an approximately linear relation with the inverse (1/L) of the distance L in the range of the distance L≦L4 and in the range of the distance L>L4, and the distance signal is in an approximately linear relation with the inverse (1/L) of the distance L in the entire range of the distance L. Therefore, the relation between the AF signal and the distance signal is also an approximately linear relation in the range of the distance L≦L4 and in the range of the distance L>L4.

The reason why the signal characteristics of the AF signal change at the border between the range of the distance L≦L4 and the range of the distance L>L4 is that in the range of the distance L≦L4 the output signal from the clamping circuit 13 is mainly the far signal $I_2$ and in the range of the distance L>L4 the output signal from the clamping circuit 13 is mainly the clamp signal $I_c$.

For the transformation of this AF signal into the distance signal, it is desirable that the distance signal after the transformation be in a complete linear relation with the inverse (1/L) of the distance, as illustrated in the graph of FIG. 5. An example of the conventional transformation techniques is as follows.

In the range of the distance L≦L4, transformation coefficients A2, B2 are first obtained by the following equations (1), (2).

$$A2=(x3-x2)/(y3-y2) \tag{1}$$

$$B2=x2-y2 \cdot A2 \tag{2}$$

Then the distance signal x is calculated from the AF signal y according to Eq. (3) below, using the transformation coefficients A2, B2, thereby performing the transformation into the distance signal.

$$x=A2 \cdot y+B2 \tag{3}$$

On the other hand, in the range of the distance L>L4, transformation coefficients A3, B3 are first obtained according to Eqs. (4), (5) below.

$$A3=(x5-x4)/(y5-y4) \tag{4}$$

$$B3=x4-y4 \cdot A3 \tag{5}$$

Then the distance signal x is calculated from the AF signal y according to Eq. (6) below, using the transformation coefficients A3, B3, thereby performing the transformation into the distance signal.

$$x=A3 \cdot y+B3 \tag{6}$$

The transformation coefficients A2, B2, A3, B3 are determined for every camera on the occasion of manufacturing of the camera in which the distance measuring apparatus is installed, and are preliminarily set in the EEPROM 2 or the like. The transformation coefficient A2 is set larger than the transformation coefficient A3 and the transformation coefficient B2 is set smaller than the transformation coefficient B3. This setting of the transformation coefficients enables the AF signal, which changes the characteristics at the border of the distance L, to be transformed into the distance signal proportional to the inverse of the distance.

This conventional transformation technique, however, sometimes fails to obtain accurate measurement result, because the AF signal varies depending upon reflectance characteristics of the subject or the like.

Figure 6:
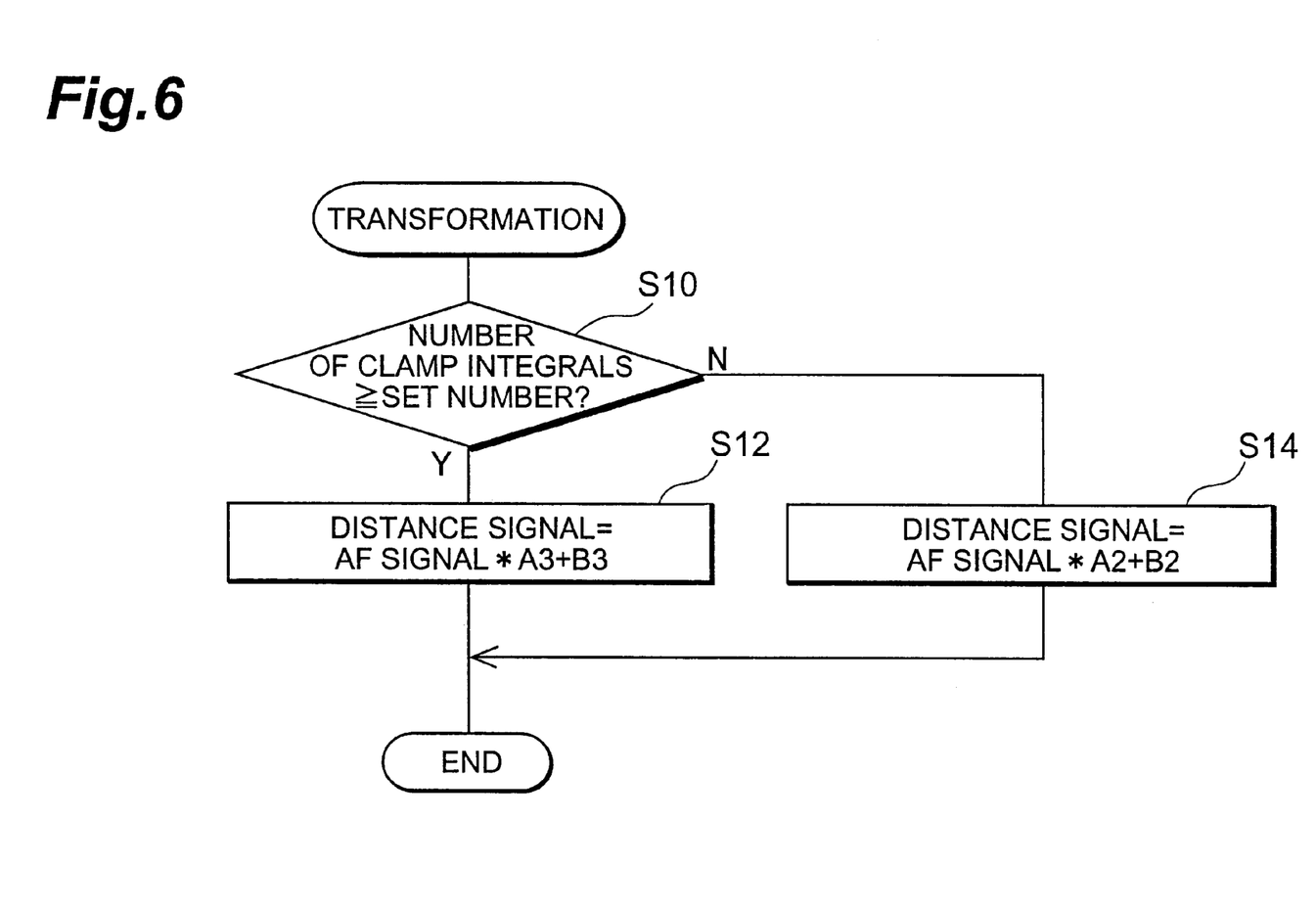
FIG. 6 is a flowchart of the transformation process in the distance measuring apparatus of FIG. 1.

Thus the transformation process into the distance signal described below is carried out in the distance measuring apparatus according to the present embodiment. FIG. 6 shows the flowchart of the transformation process from the AF signal to the distance signal in the distance measuring apparatus according to the present embodiment.

In the transformation process into the distance signal, the first step is S10 of FIG. 6 to determine whether the number of integral operations with the clamp signal $I_c$ out of the set number of integral operations is not less than the number preset in the CPU 1.

For example, let us suppose that three hundred twenty eight integral operations are carried out during one ranging routine and the number preset in the CPU 1 is 100. Then it is determined after completion of the three hundred twenty eight integral operations whether the number of integrals with output of the clamp signal $I_c$ as the output signal $I_{2c}$ from the clamping circuit 13 (the number of clamp integrals) out of the three hundred twenty eight integral operations is not less than 100. The number of integrals with the clamp signal $I_c$ is set based on the output detection signal (clamp determination signal) outputted from the comparator 37 of the clamping circuit 13.

When this step S10 results in determining that the number of integral operations with the clamp signal $I_c$ is not less than the set number, the flow transfers to S12 to calculate the distance signal y, based on the AF signal x and the transformation constants A3, B3 according to Eq. (6) described above.

On the other hand, when the step S10 results in determining that the number of integral operations with the clamp signal $I_c$ is less than the set number, the flow transfers to S14 to calculate the distance signal y, based on the AF signal x and the transformation constants A2, B2, according to Eq. (3) described above.

As described above, when a plurality of integral operations are carried out in one ranging routine, the transformation from the AF signal to the distance signal is carried out by either of the different transformation equations in accordance with the number of integrals with the clamp signal $I_c$, which improves the ranging accuracy.

Figure 7:
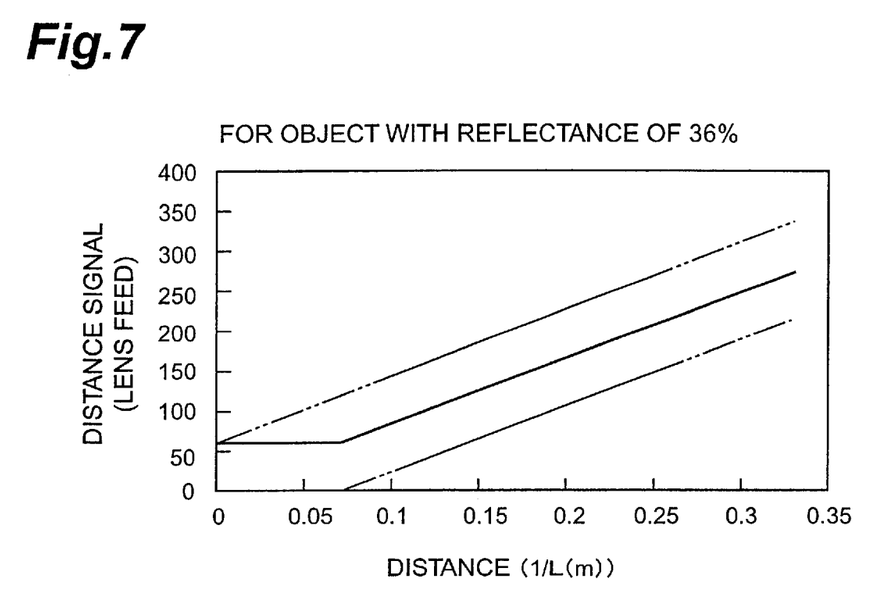
FIG. 7 is a graph to show the result of transformation to the distance signal by the conventional transformation technique.
Figure 8:
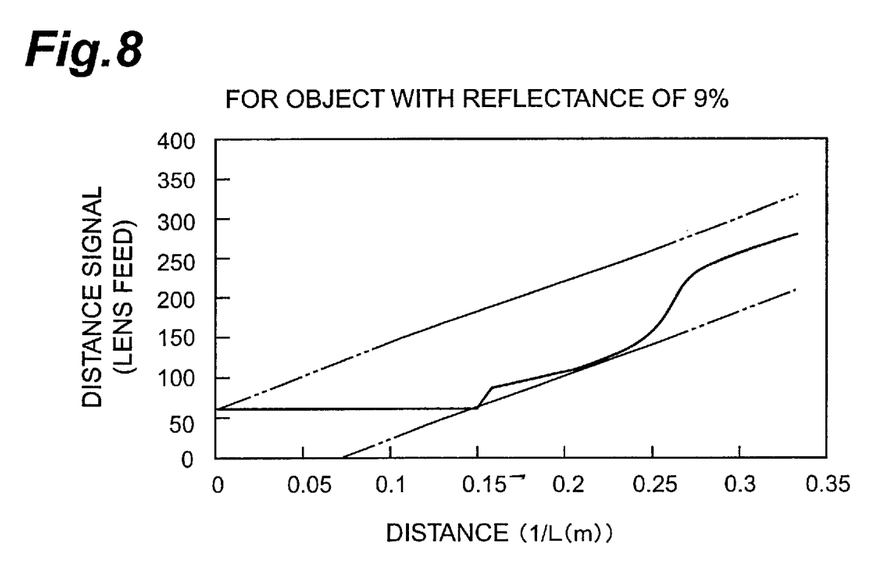
FIG. 8 is a graph to show the result of transformation to the distance signal by the conventional transformation technique.
Figure 9:
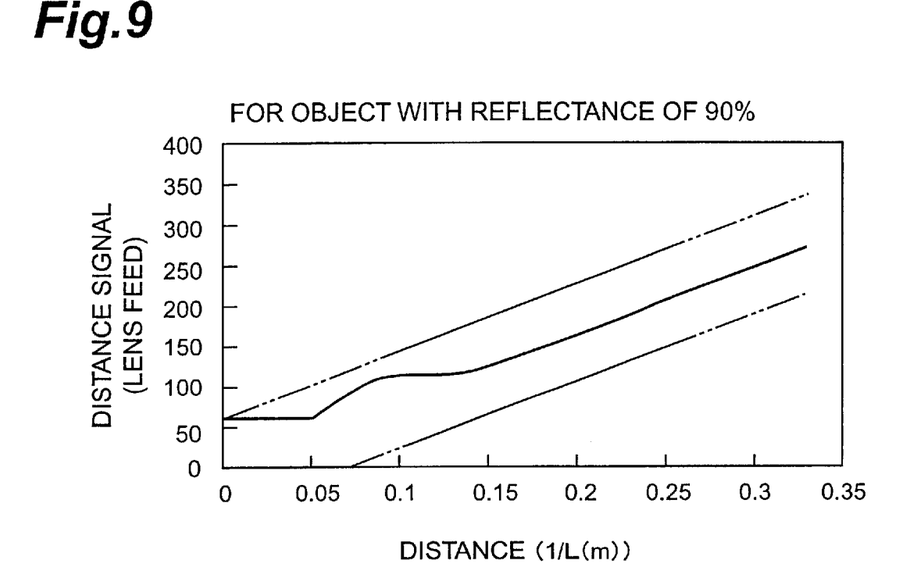
FIG. 9 is a graph to show the result of transformation to the distance signal by the conventional transformation technique.
Figure 10:
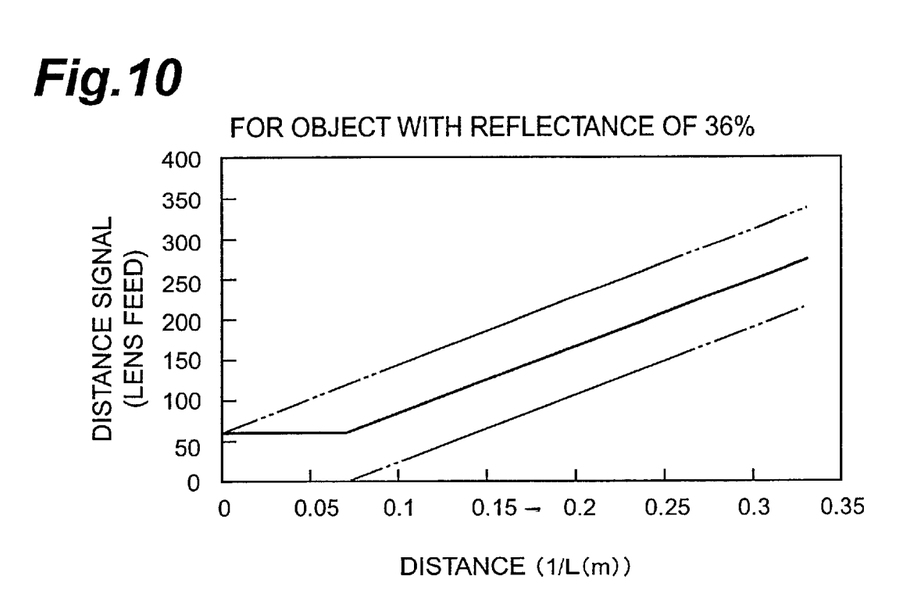
FIG. 10 is a graph to show the result of transformation to the distance signal by the transformation process in the distance measuring apparatus of FIG. 1.
Figure 11:
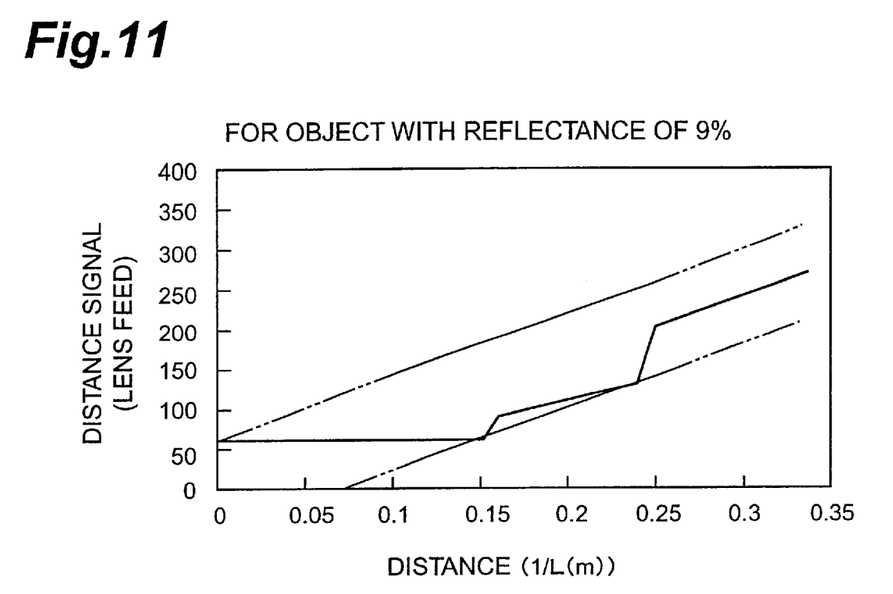
FIG. 11 is a graph to show the result of transformation to the distance signal by the transformation process in the distance measuring apparatus of FIG. 1.
Figure 12:
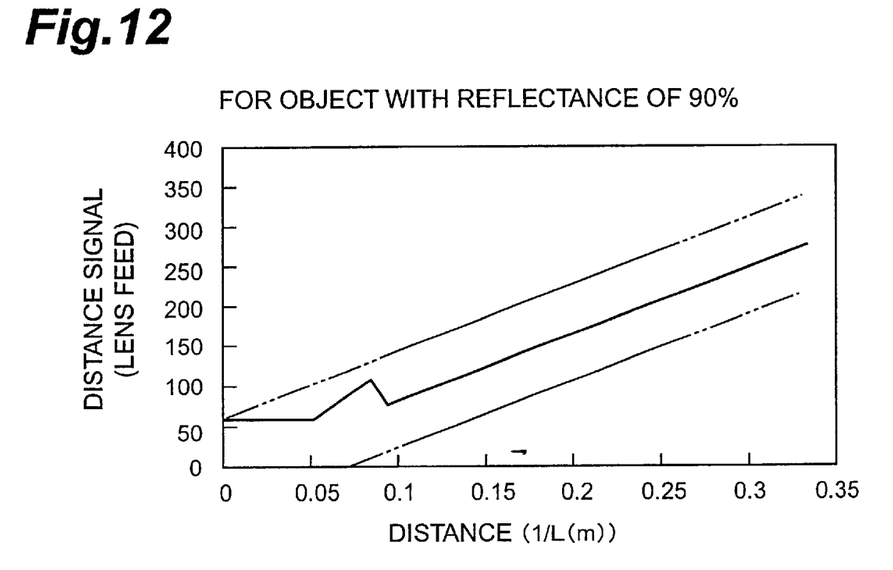
FIG. 12 is a graph to show the result of transformation to the distance signal by the transformation process in the distance measuring apparatus of FIG. 1.

FIG. 7 to FIG. 9 show the transformation results to the distance signal by the conventional transformation technique and FIG. 10 to FIG. 12 the transformation results to the distance signal in the distance measuring apparatus according to the present embodiment.

FIG. 7 shows the relation between the distance of the object and the distance signal in the measurement where the distance was measured to the object with the reflectance of 36% by the aforementioned conventional transformation technique. FIG. 8 shows the relation between the distance of the object and the distance signal in the measurement where the distance was measured to the object with the reflectance of 9% by the aforementioned conventional transformation technique. Further, FIG. 9 shows the relation between the distance of the object and the distance signal in the measurement where the distance was measured to the object with the reflectance of 90% by the aforementioned conventional transformation technique.

On the other hand, FIG. 10 shows the relation between the distance of the object and the distance signal in the measurement where the distance was measured to the object with the reflectance of 36% by the transformation process of the distance measuring apparatus according to the present embodiment (i.e., by the transformation process illustrated in the flowchart of FIG. 6). FIG. 11 shows the relation between the distance of the object and the distance signal in the measurement where the distance was measured to the object with the reflectance of 9% by the transformation process of the distance measuring apparatus according to the present embodiment. FIG. 12 shows the relation between the distance of the object and the distance signal in the measurement where the distance was measured to the object with the reflectance of 90% by the transformation process of the distance measuring apparatus according to the present embodiment.

In FIG. 7 to FIG. 12, the solid line indicates the characteristics of the distance signal after the transformation and dashed lines above and below the solid line indicate the tolerance of the transformation.

From comparison between the transformation results of FIG. 7 and FIG. 10, there is little change in the characteristics of the distance signal between the transformation process of the distance measuring apparatus according to the present embodiment and the conventional transformation technique. From comparison between the transformation results of FIG. 8 and FIG. 11, there is no big change in the characteristics of the distance signal between the transformation process of the distance measuring apparatus according to the present embodiment and the conventional transformation technique, either.

From comparison between the transformation results of FIG. 9 and FIG. 12, however, it is seen that there is such a tendency that in the transformation by the conventional transformation technique of FIG. 9 the characteristics of the distance signal become a little larger on the far side where the inverse (1/L) of the distance is small. In contrast with it, the characteristics of the distance signal are improved on the far side by the transformation process of the present embodiment of FIG. 12, because the transformation to the distance signal is carried out with the transformation constants A2, B2 suitable for distances before the start of execution of the clamp ranging.

In the distance measuring apparatus according to the present embodiment, as described above, when a plurality of integral operations are carried out in one ranging routine, the transformation from the AF signal to the distance signal is carried out by either of the different transformation equations, depending upon the number of integrals with the clamp signal $I_c$, whereby the distance signal resulting from the transformation can represent the distance closer to the ideal value. Therefore, the present embodiment can achieve the improvement in the ranging accuracy.

(Second Embodiment)

Next, the distance measuring apparatus according to the second embodiment will be described below.

The distance measuring apparatus according to the present embodiment has the structure almost similar to that of the distance measuring apparatus according to the first embodiment, but is different therefrom in that the transformation process from the AF signal to the distance signal is carried out according to a different method.

Figure 13:
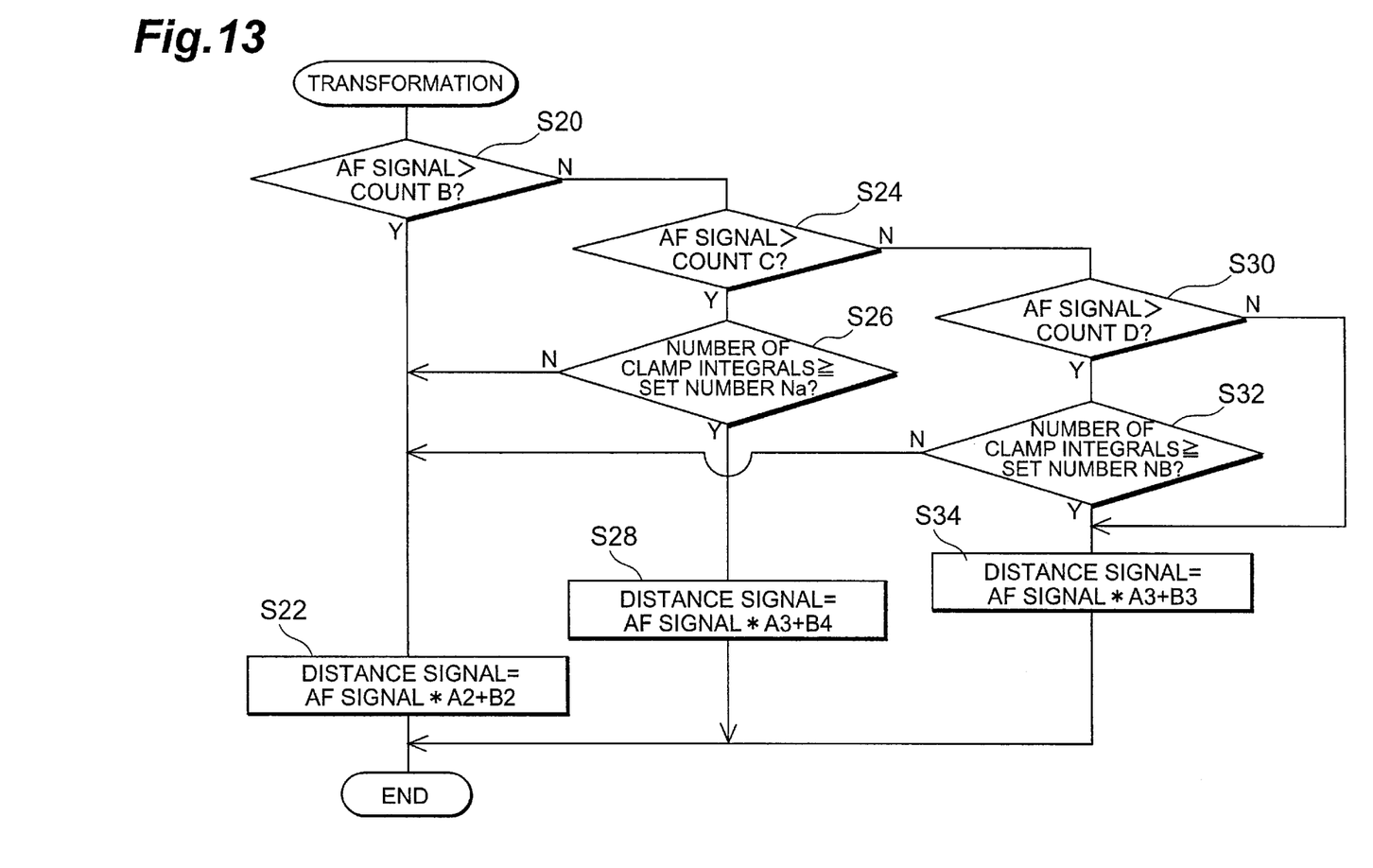
FIG. 13 is a flowchart of the transformation process in the distance measuring apparatus according to the second embodiment.

FIG. 13 shows the flowchart of the transformation process from the AF signal to the distance signal in the distance measuring apparatus according to the present embodiment.

In S20 of FIG. 13, it is determined whether the AF signal is larger than COUNT_B, which is a set value preset in the EEPROM 2. When it is determined in this S20 that the AF signal is larger than COUNT_B, the flow transfers to S22 to calculate the distance signal y, based on the AF signal x and the transformation constants A2, B2, according to Eq. (3) described above.

When it is determined in S20 on the other hand that the AF signal is not larger than COUNT_B, the flow transfers to S24 to determine whether the AF signal is not less than COUNT_C, which is a set value preset in the EEPROM 2. This COUNT_C is set to a value smaller than COUNT_B.

When it is determined in S24 that the AF signal is not less than COUNT_C, the flow transfers to S26 to determine whether the number of integral operations with the clamp signal $I_c$ out of the set number of integral operations is not less than a set number Na preset in the CPU 1.

For example, let us suppose that three hundred twenty eight integral operations are carried out in one ranging routine and the number Na preset in the CPU 1 is 100. Then it is determined after completion of three hundred twenty eight integral operations whether the number of integrals with output of the clamp signal $I_c$ as the output signal $I_{2c}$ from the clamping circuit 13 (the number of clamp integrals) out of the three hundred twenty eight integral operations is not less than 100. The number of integrals with the clamp signal $I_c$ is set based on the output detection signal (clamp determination signal) outputted from the comparator 37 of the clamp circuit 13.

When it is determined in this S26 that the number of integral operations with the clamp signal $I_c$ is not less than the set number Na, the flow transfers to S28 to calculate the distance signal y, based on the AF signal x and the transformation constants A3, B4, according to Eq. (7) below.

$$x = A3 \cdot y + B4 \quad (7)$$

Here the transformation constants A3, B4 are set values preset in the EEPROM 2 or the like and are set for every camera on the occasion of manufacturing of the camera in which the distance measuring apparatus is installed. The transformation constant A3 is the one similar to that of aforementioned Eq. (6). The transformation constant B4 is set larger than the aforementioned transformation constant B3.

When it is determined in S26 on the other hand that the number of integral operations with the clamp signal $I_c$ is less than the set number Na, the flow transfers to S22 to calculate the distance signal y, based on the AF signal x and the transformation constants A2, B2, according to Eq. (3).

Meanwhile, when it is determined in S24 that the AF signal is less than COUNT_C, the flow transfers to S30 to determine whether the AF signal is greater than COUNT_D, which is a set value preset in the EEPROM 2. This COUNT_D is set to a value smaller than COUNT_C.

When it is determined in S30 that the AF signal is not less than COUNT_D, the flow transfers to S32 to determine whether the number of integral operations with the clamp signal $I_c$ out of the set number of integral operations is not less than a set number Nb preset in the CPU 1.

When it is determined in this S32 that the number of integral operations with the clamp signal $I_c$ is not less than the set number Nb, the flow transfers to S34 to calculate the distance signal y, based on the AF signal x and the transformation constants A3, B3, according to Eq. (6).

When it is determined in S32 on the other hand that the number of integral operations with the clamp signal $I_c$ is less than the set number Nb, the flow transfers to S22 to calculate the distance signal y, based on the AF signal x and the transformation constants A2, B2, according to Eq. (3).

Meanwhile, when it is determined in S30 that the AF signal is less than COUNT_D, the flow transfers to S34 to calculate the distance signal y, based on the AF signal x and the transformation constants A3, B3, according to Eq. (6).

As described above, when a plurality of integral operations are carried out in one ranging routine, the transformation from the AF signal to the distance signal is carried out by either of the different transformation equations, depending upon the value of the AF signal, and the transformation from the AF signal to the distance signal is carried out by either of the different transformation equations, depending upon the number of integrals with the clamp signal $I_c$, which improves the ranging accuracy.

Figure 14:
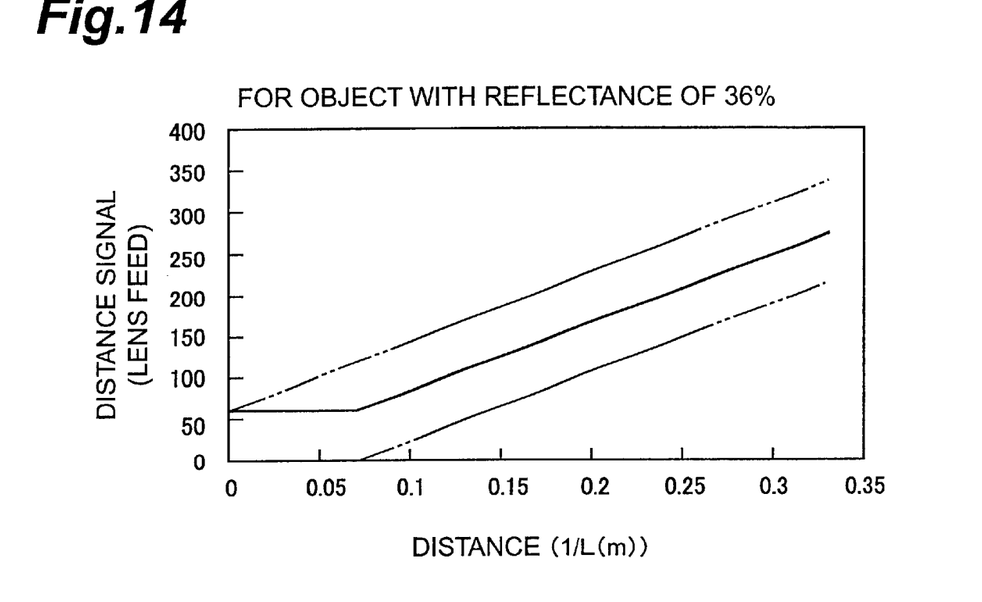
FIG. 14 is a graph to show the result of transformation to the distance signal by the transformation process in the distance measuring apparatus according to the second embodiment.
Figure 15:
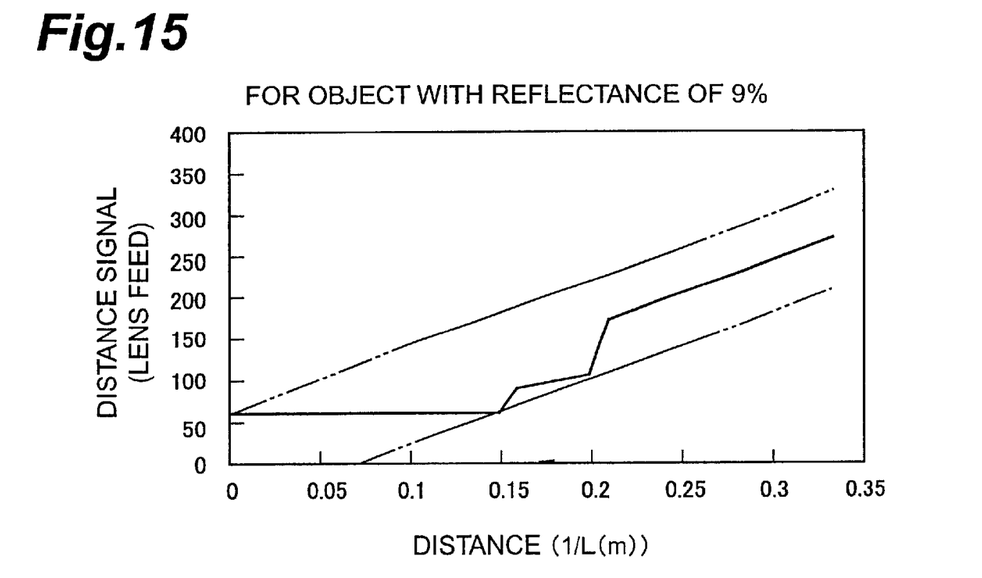
FIG. 15 is a graph to show the result of transformation to the distance signal by the transformation process in the distance measuring apparatus according to the second embodiment.
Figure 16:
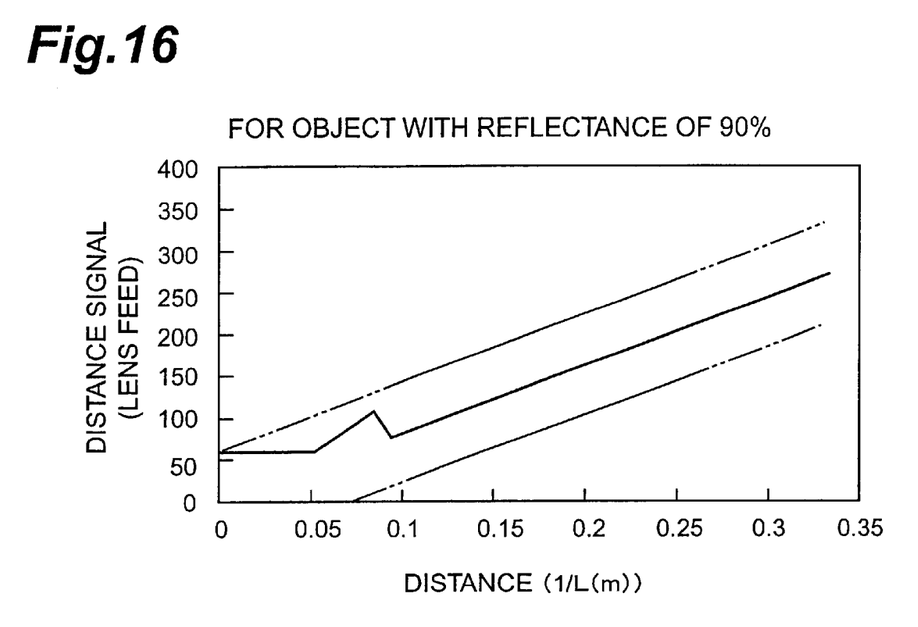
FIG. 16 is a graph to show the result of transformation to the distance signal by the transformation process in the distance measuring apparatus according to the second embodiment.

FIG. 14 to FIG. 16 show the results of the transformation to the distance signal in the distance measuring apparatus according to the present embodiment.

FIG. 14 shows the relation between the distance of the object and the distance signal in the measurement where the distance was measured to the object with the reflectance of 36% by the transformation process of the distance measuring apparatus according to the present embodiment (i.e., the transformation process illustrated in the flowchart of FIG. 13). FIG. 15 shows the relation between the distance of the object and the distance signal in the measurement where the distance was measured to the object with the reflectance of 9% by the transformation process of the distance measuring apparatus according to the present embodiment. FIG. 16 shows the relation between the distance of the object and the distance signal in the measurement where the distance was measured to the object with the reflectance of 90% by the transformation process of the distance measuring apparatus according to the present embodiment.

FIG. 14 to FIG. 16 show the characteristics of the distance signal after the transformation by the solid line and the tolerance of the transformation by the dashed lines above and below the solid line.

From comparison between the transformation results of FIG. 14 and FIG. 7, there is little change in the characteristics of the distance signal between the transformation process of the distance measuring apparatus according to the present embodiment and the conventional transformation technique.

From comparison between the transformation results of FIG. 15 and FIG. 8, it is seen that there is such a tendency of transformation that by the conventional transformation technique of FIG. 8 the characteristics of the distance signal become smaller on the near side where the inverse (1/L) of the distance is large. In contrast with it, the characteristics are improved by the transformation process of the distance measuring apparatus of the present embodiment in FIG. 15, because the characteristics of the distance signal do not appear small on the near side where the inverse (1/L) of the distance is large. The reason is that during execution of the clamp ranging with the AF signal not less than COUNT_C, it is determined that the reflectance of the object is low and the transformation to the distance signal is carried out with the transformation constants A3, B4 suitable for the reflectance.

From comparison between the transformation results of FIG. 16 and FIG. 9, it is further seen that there is such a tendency that by the conventional transformation technique of FIG. 9 the characteristics of the distance signal become a little larger on the far side where the inverse (1/L) of the distance is small. In contrast with it, the characteristics are improved by the transformation process of the distance measuring apparatus of the present embodiment of FIG. 16, because the characteristics of the distance signal do not appear large on the far side where the inverse (1/L) of the distance is small. The reason is that when the clamp ranging is not carried out with the AF signal not less than COUNT_D, it is determined that the reflectance of the object is high and the transformation to the distance signal is carried out with the transformation constants A2, B2 suitable for the reflectance.

In the distance measuring apparatus according to the present embodiment, as described above, when a plurality of integral operations are carried out in one ranging routine, the transformation from the AF signal to the distance signal is carried out by either of the different transformation equations, depending upon the value of the AF signal, and the transformation from the AF signal to the distance signal is carried out by either of the different transformation equations, depending upon the number of integrals with the clamp signal $I_c$, whereby the distance signal resulting from the transformation can represent the distance closer to the ideal value. Therefore, the present embodiment can achieve the improvement in the ranging accuracy.

As described above, according to the present invention, when a plurality of integral operations are carried out in a ranging routine, the integral signal can be transformed to the distance signal according to the distance to the object by either of the different transformation equations selected according to the output state of the clamp signal in every integral. Therefore, the invention enables the proper transformation to the distance signal to be performed, and thus improves the ranging accuracy.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus comprising:

light projecting means for projecting a light beam toward an object at a distance to be measured, multiple times;

light detecting means for detecting light of the light beam reflected from the object, at a reception position according to the distance to the object and outputting a far signal, which increases with an increase in the distance, and a near signal, which increases with a decrease in the distance;

clamping means for comparing the far signal with a preset clamp signal, outputting the far signal when the far signal is not less than the clamp signal, and outputting the clamp signal when the far signal is smaller than the clamp signal;

calculating means for calculating a ratio of the near signal and the signal output from said clamping means and outputting an output ratio signal;

output signal detecting means for detecting whether the signal output from said clamping means is the far signal or the clamp signal;

integrating means for accumulating the output ratio signal for every emission of the light beam from said light projecting means to perform an integration and outputting an integral signal according to the integration; and transforming means for transforming the integral signal to a distance signal according to the distance, in accordance with transformation equations based on the detecting by said output signal detecting means.

2. The distance measuring apparatus according to claim 1, wherein said transforming means transforms the integral signal to the distance signal according to the distance using the transformation equations, based on whether the number of the clamp signals output from said clamping means during the integration by said integrating means is not less than a set number.

3. The distance measuring apparatus according to claim 1, wherein said transforming means transforms the integral signal to the distance signal according to the distance using the transformation equations, based on whether the number of the clamp signals output from said clamping means during the integration by said integrating means is not less than a set number and whether the integral signal is not less than a set value.

* * * * *